US010637909B2

(12) United States Patent
Seay

(10) Patent No.: US 10,637,909 B2
(45) Date of Patent: Apr. 28, 2020

(54) METHODS FOR MANAGING ENTITY PROFILES AND APPLICATION LAUNCHING IN SOFTWARE APPLICATIONS

(71) Applicant: Gordon E. Seay, San Diego, CA (US)

(72) Inventor: Gordon E. Seay, San Diego, CA (US)

( * ) Notice: Subject to any disclaimer, the term of this patent is extended or adjusted under 35 U.S.C. 154(b) by 122 days.

(21) Appl. No.: 13/841,726

(22) Filed: Mar. 15, 2013

(65) Prior Publication Data

US 2014/0280487 A1    Sep. 18, 2014

(51) Int. Cl.
*H04L 29/08* (2006.01)
*H04L 29/06* (2006.01)

(52) U.S. Cl.
CPC .............. *H04L 67/10* (2013.01); *H04L 63/08* (2013.01); *H04L 67/02* (2013.01); *H04L 67/30* (2013.01)

(58) Field of Classification Search
CPC .............................. G06F 21/41; H04L 63/0815
USPC .......................................................... 709/203
See application file for complete search history.

(56) References Cited

U.S. PATENT DOCUMENTS

| 6,362,836 B1 * | 3/2002 | Shaw et al. .............. 715/744 |
| 7,496,954 B1 * | 2/2009 | Himawan .............. G06F 21/41 726/8 |
| 7,673,327 B1 * | 3/2010 | Polis .................. G06F 17/3089 713/151 |
| 8,375,330 B2 * | 2/2013 | Kieselbach .......... G06Q 10/107 705/7.11 |
| 8,443,429 B1 * | 5/2013 | Johnson, Sr. ......... H04L 67/306 726/1 |
| 9,135,601 B2 * | 9/2015 | Manry .................... G06Q 50/01 |
| 2006/0230343 A1 * | 10/2006 | Armandpour et al. ....... 715/517 |
| 2007/0162574 A1 * | 7/2007 | Williamson ............ G06F 21/31 709/220 |
| 2007/0250920 A1 * | 10/2007 | Lindsay ............................ 726/7 |
| 2009/0288084 A1 * | 11/2009 | Astete et al. ...................... 718/1 |
| 2010/0042511 A1 * | 2/2010 | Sundaresan ............ G06Q 10/10 705/26.1 |
| 2012/0291114 A1 * | 11/2012 | Poliashenko ........... G06F 21/41 726/8 |
| 2013/0212485 A1 * | 8/2013 | Yankovich ............ G06F 9/4451 715/741 |
| 2014/0101556 A1 * | 4/2014 | Pinard ................... G06Q 10/06 715/734 |

(Continued)

*Primary Examiner* — Kevin T Bates
*Assistant Examiner* — Ronak Patel
(74) *Attorney, Agent, or Firm* — Schwabe, Williamson & Wyatt, P.C.

(57) ABSTRACT

Methods for managing entity profiles and application launching in software applications, including providing a network connected application server, providing an application configured to be loaded on a client computer, receiving credentials associated with a user from the client computer with the application server, identifying subscribed entities associated with the user, displaying a visual representation of the subscribed entities associated with the user on the client computer, and transferring entity profile data to the application in response to the user selecting the visual representation of one of the subscribed entities. In some examples, the methods include loading a launching utility on a client computer, where the launching utility is configured to display a user interface displaying a user subset of software applications.

19 Claims, 8 Drawing Sheets

(56) References Cited

U.S. PATENT DOCUMENTS

| | | | |
|---|---|---|---|
| 2014/0108985 A1* | 4/2014 | Scott | G05B 15/02 |
| | | | 715/771 |
| 2014/0115003 A1* | 4/2014 | Paymal | G06F 21/6227 |
| | | | 707/784 |
| 2014/0258547 A1* | 9/2014 | Scavo | H04L 29/06 |
| | | | 709/227 |

\* cited by examiner

METHODS FOR MANAGING ENTITY PROFILES AND APPLICATION LAUNCHING IN SOFTWARE APPLICATIONS

BACKGROUND

The present disclosure relates generally to methods for managing entity profiles and application launching in software applications. In particular, methods for enabling a user to switch entity profiles within one or more software applications are described.

Modern software applications provide many tools and conveniences to businesses (also referred to herein more broadly as entities, which may encompass other types of units). One category of software known as Software-As-A-Service ("SAAS") applications enables a user or multiple authorized users to log into hosted applications and perform tasks. Of course, software applications beyond SAAS applications are in common use by businesses and serve to enable any number of authorized users to conduct business with the applications.

Historically, the visual output of software applications targets a single business and the users are affiliated with that business. Business data has been stored in local files or repositories specific to a single business. Targeting the visual output of a software application to a business provides many efficiencies and conveniences. For example, data corresponding to the business can be readily accessed by the application, enabling the data to be conveniently utilized by the application without a user needing to laboriously and potentially inaccurately enter the data each time the data corresponding to the business is needed.

A problem arises, however, when a given user must access and use applications on behalf of multiple businesses. For example, an accountant may need to use an accounting application for multiple business clients. As another example, an executive affiliated with more than one business may need to use business applications on behalf each business with which he is affiliated.

Known methods for people to utilize applications on behalf of multiple businesses are not entirely satisfactory. For example, existing methods require the user to maintain separate login credentials for each business and login credentials are prone to be lost and/or forgotten. Further, known methods require the user to separately enter login credentials whenever the user wants to switch company profiles, which quickly becomes tedious and interrupts work flow.

Another known method is to provide separate application pages with distinct application addresses for each business. However, this method is also undesirable as it requires a user to remember a separate application address for each company and/or to store separate shortcuts for each business-application combination.

In addition, conventional methods do not readily or conveniently store session information corresponding to the user's current software session using one business profile when switching to use the software with another business profile. Moreover, existing methods do not provide means for conveniently loading data corresponding to the user's prior software session with a given business profile loaded when the user desires to switch back to that business profile.

Another shortcoming of known methods for utilizing applications with different business profiles is that data intended for one business can be inadvertently entered for another business by mistake. This cross-contamination problem can arise when a user utilizes the application in a first instance with a first business profile loaded and opens a separate instance of the application with a second business profile loaded. If the user returns to the first instance, she may inadvertently store data for the first business in the second business' data.

Thus, there exists a need for methods for managing entity profiles within software applications that improve upon and advance the design of known methods. Examples of methodologies related and relevant to the methodologies described herein are discussed in the inventor's copending patent application entitled Methods And Systems For Switching Between Software Applications, filed on Mar. 15, 2013. Examples of new and useful methods relevant to the needs existing in the field are discussed below.

SUMMARY

The present disclosure is directed to methods for managing entity profiles and application launching in software applications, including providing a network connected application server, providing an application configured to be loaded on a client computer, receiving credentials associated with a user from the client computer with the application server, identifying subscribed entities associated with the user, displaying a visual representation of the subscribed entities associated with the user on the client computer, and transferring entity profile data to the application in response to the user selecting the visual representation of one of the subscribed entities. In some examples, the methods include loading an entity launching utility on a client computer, where the entity launching utility is configured to display a user interface displaying a user subset of software applications.

DETAILED DESCRIPTION

The disclosed methods for managing entity profiles and application launching within software applications will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various methods for managing entity profiles and application launching within software applications are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Various disclosed examples may be implemented using electronic circuitry configured to perform one or more functions. For example, with some embodiments of the invention, the disclosed examples may be implemented using one or more application-specific integrated circuits (ASICs). More typically, however, components of various examples of the invention will be implemented using a programmable computing device executing firmware or software instructions, or by some combination of purpose-specific electronic circuitry and firmware or software instructions executing on a programmable computing device.

Figure 1:
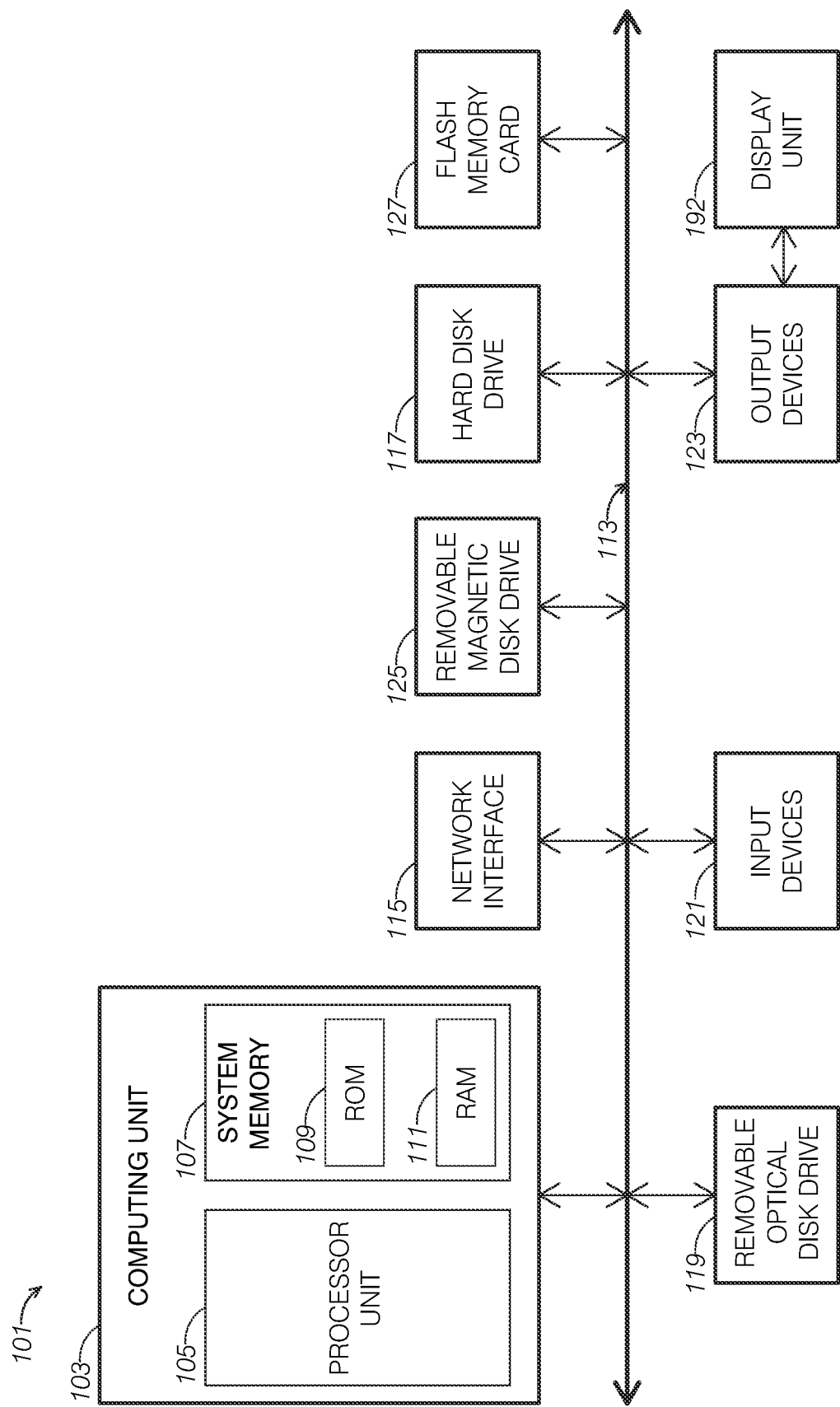
FIG. 1 shows a schematic view of an example of a programmable computing device.

Accordingly, FIG. 1 shows one illustrative example of a computer 101 that can be used to implement various embodiments of the invention. Computer 101 may be incorporated within a variety of consumer electronic devices, such as personal media players, cellular phones, smart phones, personal data assistants, global positioning system devices, and the like.

As seen in this figure, computer 101 has a computing unit 103. Computing unit 103 typically includes a processing unit 105 and a system memory 107. Processing unit 105 may be any type of processing device for executing software instructions, but will conventionally be a microprocessor device. System memory 107 may include both a read-only memory (ROM) 109 and a random access memory (RAM) 111. As will be appreciated by those of ordinary skill in the art, both read-only memory (ROM) 109 and random access memory (RAM) 111 may store software instructions to be executed by processing unit 105.

Processing unit 105 and system memory 107 are connected, either directly or indirectly, through a bus 113 or alternate communication structure to one or more peripheral devices. For example, processing unit 105 or system memory 107 may be directly or indirectly connected to additional memory storage, such as a hard disk drive 117, a removable optical disk drive 119, a removable magnetic disk drive 125, and a flash memory card 127. Processing unit 105 and system memory 107 also may be directly or indirectly connected to one or more input devices 121 and one or inure output devices 123. Input devices 121 may include, for example, a keyboard, touch screen, a remote control pad, a pointing device (such as a mouse, touchpad, stylus, trackball, or joystick), a scanner, a camera or a microphone. Output devices 123 may include, for example, a display unit 192, such as a monitor display, an integrated display, or a television; a printer; a stereo; or speakers.

Still further, computing unit 103 will be directly or indirectly connected to one or more network interfaces 115 for communicating with a network. This type of network interface 115, also sometimes referred to as a network adapter or network interface card (NIC), translates data and control signals from computing unit 103 into network messages according to one or more communication protocols, such as the Transmission Control Protocol (TCP), the Internet Protocol (IP), and the User Datagram Protocol (UDP). These protocols are well known in the art, and thus will not be discussed here in more detail. An interface 115 may employ any suitable connection agent for connecting to a network, including, for example, a wireless transceiver, a power line adapter, a modem, or an Ethernet connection.

It should be appreciated that, in addition to the input, output and storage peripheral devices specifically listed above, the computing device may be connected to a variety of other peripheral devices, including some that may perform input, output and storage functions, or some combination thereof. For example, the computer 101 may be connected to a digital music player, such as an IPOD® brand digital music player or iOS or Android based smartphone. As known in the art, this type of digital music player can serve as both an output device for a computer (e.g., outputting music from a sound file or pictures from an image file) and a storage device.

In addition to a digital music player, computer 101 may be connected to or otherwise include one or more other peripheral devices, such as a telephone. The telephone may be, for example, a wireless "smart phone," such as those featuring the Android or iOS operating systems. As known in the art, this type of telephone communicates through a wireless network using radio frequency transmissions. In addition to simple communication functionality, a "smart phone" may also provide a user with one or more data management functions, such as sending, receiving and viewing electronic messages (e.g., electronic mail messages, SMS text messages, etc.), recording or playing back sound files, recording or playing back image files (e.g., still picture or moving video image files), viewing and editing files with text (e.g., Microsoft Word or Excel files, or Adobe Acrobat files), etc. Because of the data management capability of this type of telephone, a user may connect the telephone with computer 101 so that their data maintained may be synchronized.

Of course, still other peripheral devices may be included with or otherwise connected to a computer 101 of the type illustrated in FIG. 1, as is well known in the art. In some cases, a peripheral device may be permanently or semi-permanently connected to computing unit 103. For example, with many computers, computing unit 103, hard disk drive 117, removable optical disk drive 119 and a display are semi-permanently encased in a single housing.

Still other peripheral devices may be removably connected to computer 101, however. Computer 101 may include, for example, one or more communication ports through which a peripheral device can be connected to computing unit 103 (either directly or indirectly through bus 113). These communication ports may thus include a parallel bus port or a serial bus port, such as a serial bus port using the Universal Serial Bus (USB) standard or the IEEE 1394 High Speed Serial Bus standard (e.g., a Firewire port). Alternately or additionally, computer 101 may include a wireless data "port," such as a Bluetooth® interface, a Wi-Fi interface, an infrared data port, or the like.

It should be appreciated that a computing device employed according various examples of the invention may include more components than computer 101 illustrated in FIG. 1, fewer components than computer 101, or a different combination of components than computer 101. Some implementations of the invention, for example, may employ one or more computing devices that are intended to have a very specific functionality, such as a digital music player or server computer. These computing devices may thus omit unnecessary peripherals, such as the network interface 115, removable optical disk drive 119, printers, scanners, external hard drives, etc. Some implementations of the invention may alternately or additionally employ computing devices that are intended to be capable of a wide variety of functions, such as a desktop or laptop personal computer. These computing devices may have any combination of peripheral devices or additional components as desired.

In many examples, computers may define mobile electronic devices, such as smartphones, tablet computers, or portable music players, often operating the iOS, Symbian, Windows-based (including Windows Mobile and Windows 8), or Android operating systems.

Figure 2:
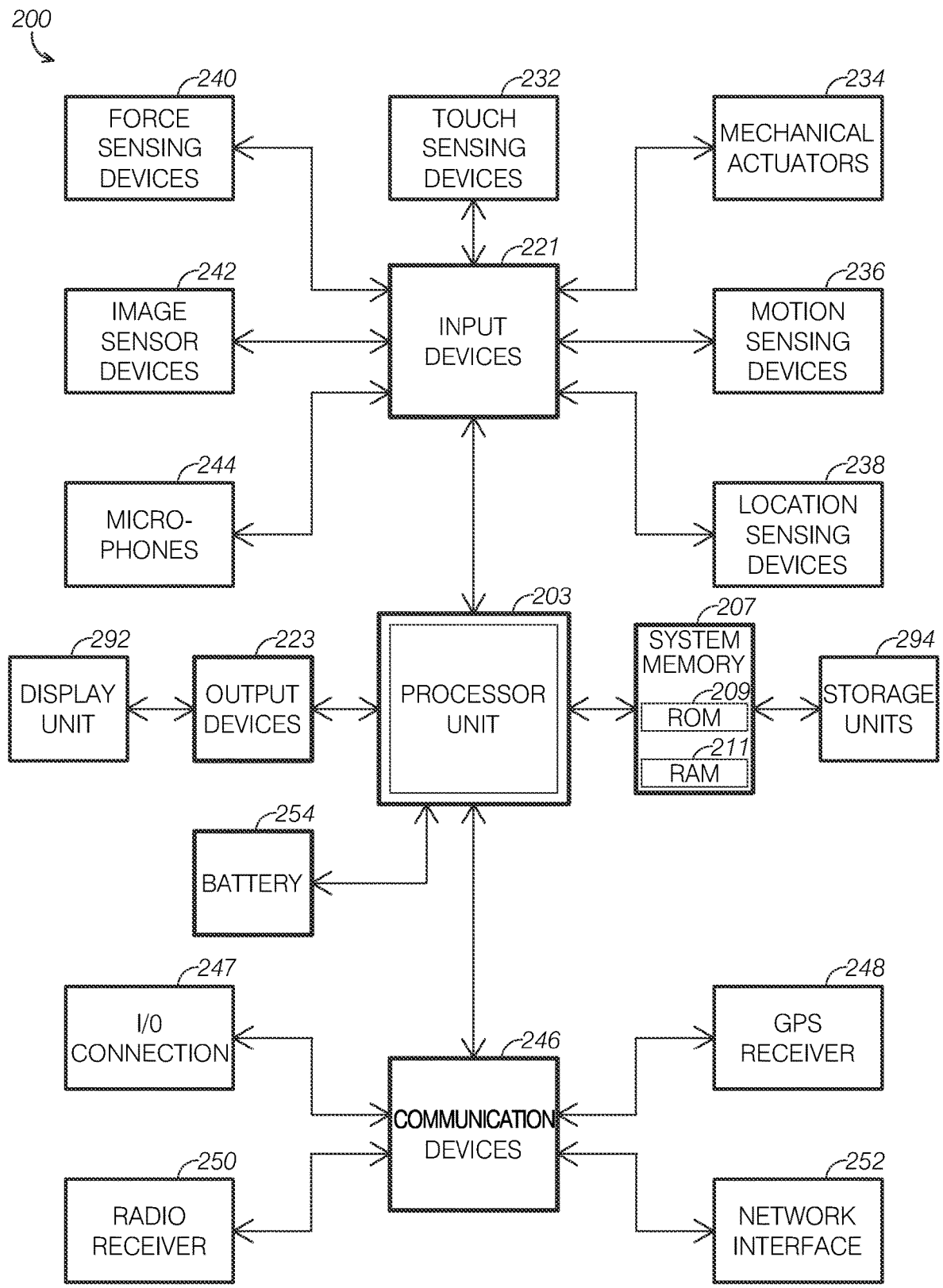
FIG. 2 shows a schematic view of an example of a mobile electronic device.

With reference to FIG. 2, an exemplary mobile device, mobile device 200, may include a processor unit 203 (e.g., CPU) configured to execute instructions and to carry out operations associated with the mobile device. For example, using instructions retrieved for example from memory, the controller may control the reception and manipulation of input and output data between components of the mobile device. The controller can be implemented on a single chip, multiple chips or multiple electrical components. For example, various architectures can be used for the controller, including dedicated or embedded processor, single purpose processor, controller, ASIC, etc. By way of example, the controller may include microprocessors, DSP, A/D converters, D/A converters, compression, decompression, etc.

In most cases, the controller together with an operating system operates to execute computer code and produce and use data. The operating system may correspond to well known operating systems such iOS, Symbian, Windows-based (including Windows Mobile and Windows 8), or Android operating systems, or alternatively to special purpose operating system, such as those used for limited purpose appliance-type devices. The operating system, other computer code and data may reside within a system memory 207 that is operatively coupled to the controller. System memory 207 generally provides a place to store computer code and data that are used by the mobile device. By way of example, system memory 207 may include read-only memory (ROM) 209, random-access memory (RAM) 211. Further, system memory 207 may retrieve data from storage units 294, which may include a hard disk drive, flash memory, etc. In conjunction with system memory 207, storage units 294 may include a removable storage device such as an optical disc player that receives and plays DVDs, or card slots for receiving mediums such as memory cards (or memory sticks).

Mobile device 200 also includes input devices 221 that are operatively coupled to processor unit 203, Input devices 221 are configured to transfer data from the outside world into mobile device 200, As shown, input devices 221 may correspond to both data entry mechanisms and data capture mechanisms, In particular, input devices 221 may include touch sensing devices 232 such as touch screens, touch pads and touch sensing surfaces, mechanical actuators 234 such as buttons or wheels or hold switches, motion sensing devices 236 such as accelerometers, location detecting devices 238 such as global positioning satellite receivers, WiFi based location detection functionality, or cellular radio based location detection functionality force sensing devices 240 such as force sensitive displays and housings, image sensor devices 242, and microphones 244, Input devices 221 may also include a clickable display actuator.

Mobile device 200 also includes various output devices 223 that are operatively coupled to processor unit 203. Output devices 223 are configured to transfer data from mobile device 200 to the outside world. Output devices 223 may include a display unit 292 such as an LCD, speakers or jacks, audio/tactile feedback devices, light indicators, and the like.

Mobile device 200 also includes various communication devices 246 that are operatively coupled to the controller. Communication devices 246 may, for example, include both an I/O connection 247 that may be wired or wirelessly connected to selected devices such as through IR, USB, or Firewire protocols, a global positioning satellite receiver 248, and a radio receiver 250 which may be configured to communicate over wireless phone and data connections. Communication devices 246 may also include a network interface 252 configured to communicate with a computer network through various means which may include wireless connectivity to a local wireless network, a wireless data connection to a cellular data network, a wired connection to a local or wide area computer network, or other suitable means for transmitting data over a computer network.

Mobile device 200 also includes a battery 254 and possibly a charging system. Battery 254 may be charged through a transformer and power cord or through a host device or through a docking station. In the cases of the docking station, the charging may be transmitted through electrical ports or possibly through an inductance charging means that does not require a physical electrical connection to be made.

The various aspects, features, embodiments or implementations of the invention described above can be used alone or in various combinations. The methods of this invention can be implemented by software, hardware or a combination of hardware and software. The invention can also be embodied as computer readable code on a computer readable medium. The computer readable medium is any data storage device that can store data which can thereafter be read by a computer system, including both transfer and non-transfer devices as defined above. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

Figure 4:
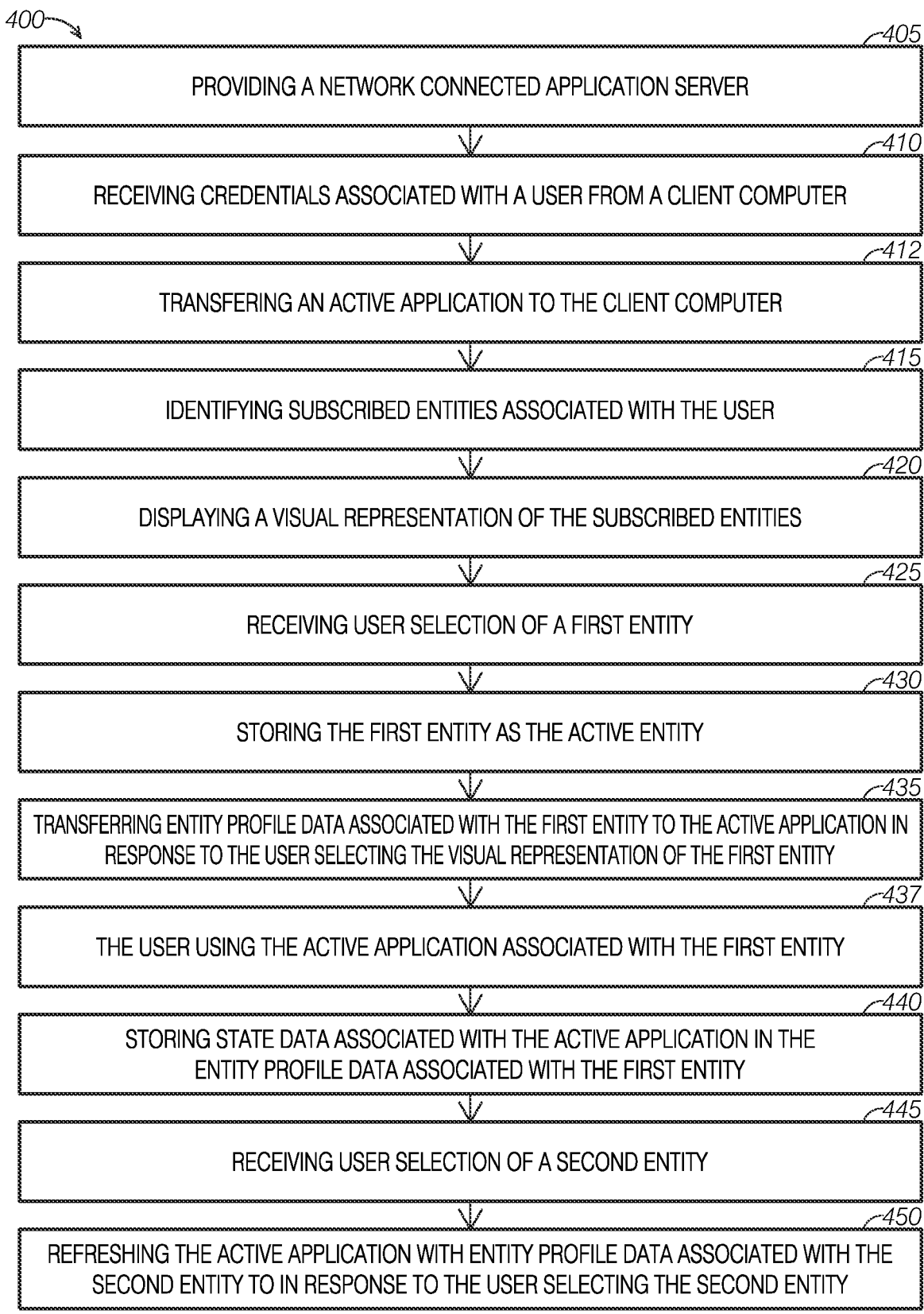
FIG. 4 is a flow diagram of an example of a method for managing entity profiles.

With reference to FIG. 4, a first example of a method for managing entity profiles in software applications, method 400, will now be described. Method 400 enables users to conveniently and efficiently utilize software applications on behalf of multiple entities. Expressed another way, a user of method 400 may switch between entity profiles with relative ease in a given software application or between different applications.

Unlike conventional approaches, method 400 does not require the user to maintain separate login credentials for each entity for which the user would like to load entity data into a software application. Thus, method 400 helps limit or avoid the user needing to maintain a large number of login credentials, which the user might lose or forget. Further, method 400 does not require the user to separately enter login credentials whenever she wants to switch entity profiles, which she would find tedious and interrupt her work flow.

Further distinguishing method 400 from other known methods is that method does not force a user to access separate application pages with distinct application addresses for each entity profile he wishes to load in a software application. Thus, method 400 does not require the user to remember a separate application address for each company or to store separate application shortcuts for each business-application combination.

As will be explained in more detail below, the methods described here serve to readily and conveniently store session information corresponding to the user's current software session using one entity profile when switching to use the software with another entity profile. Accordingly, method 400 advances the art over existing methods, which do not provide means for conveniently loading data corresponding to the user's prior software session with a given entity profile loaded when the user desires to switch back to that entity profile.

The methods described herein address another shortcoming of known methods for utilizing applications with different entity profiles with regard to data cross-contamination between entities. With conventional methods, too easily data intended for one entity can be inadvertently entered for another entity by mistake. The methods described in this application reduce or eliminate cross-contamination when a user utilizes an application in a first instance with a first entity profile loaded by monitoring and flagging when the user attempts to open a separate instance of the application with a second entity profile loaded.

As shown in FIG. 4, method 400 includes providing a network connected application server at step 405, receiving credentials associated with a user from a client computer at step 410, transferring an active application to the client computer at step 412, identifying subscribed entities associated with the user at step 415, displaying a visual representation of the subscribed entities at step 420, receiving user selection of a first entity at step 425, storing the first entity as the active entity at step 430, transferring entity profile data associated with the first entity to the selected application in response to the user selecting the visual representation of the first entity at step 435, the user using the active application associated the first entity at step 437, storing state data associated with the active application in the entity profile data associated with the first entity at step 440, receiving user selection of a second entity at step 445, and refreshing the active application with entity profile data associated with the second entity to in response to the user selecting the second entity at step 450. The steps of method 400 and of related method examples will now be explained in more detail. In some examples, application servers may define clusters of computing devices configured to cooperate to deliver content to client computers.

Figure 3:
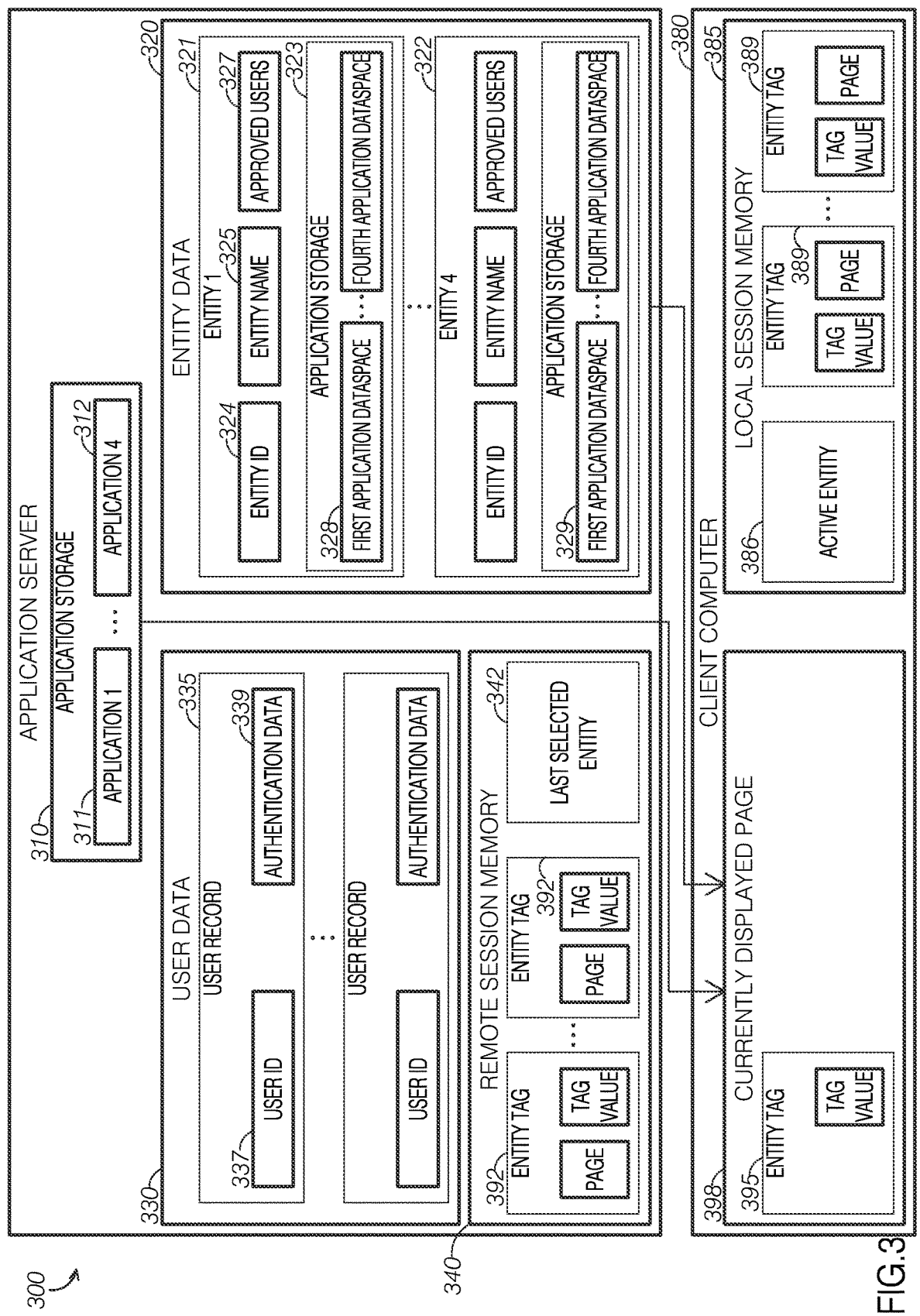
FIG. 3 shows a diagrammatic view of an application server and a client computer.

Providing a network connected application server at step 405 includes providing a storage unit with the application server. The storage unit may be any currently known or later developed means for storing data in a computing environment, including memory local to the application server and remote memory in data communication with the application server. The storage unit may be a single memory unit or may be an array of memory units cooperating together to store data. FIG. 3 illustrates a diagrammatic example of the data stored on an example application server, application server 300.

The storage unit in method 400 stores a set of software applications, such as a first application 311 and a fourth application 312 in application storage 310 displayed in FIG. 3, and entity profile data, such as a first entity profile 321 and a fourth entity profile 322 displayed in entity data 320. The example shown in FIG. 3 includes four applications and entities for illustrative purposes only; various examples may have any number of entities and/or applications. Of course, the storage unit may store additional or alternative data. For example, the storage unit may store state data associated with an entity profile or session data associated with a given application session. Additionally or alternatively, the storage unit may store one or more user records associated with user of the application server. Among other information, the user record may include user authentication data.

In some examples, state data is stored on or within remotely hosted state servers, locally hosted state servers, application servers, database servers, hidden form fields, querystrings, cookies, or some combination thereof.

As FIG. 3 illustrates, entity profiles may additionally include entity ID data that uniquely identify each entity, such as with a key value, unique alphanumeric designator, or other unique identifier. As FIG. 3 shows, entity ID data may be stored, for example, in an entity ID field 324 in entity profile data.

As FIG. 3 illustrates, entity profiles may additionally include entity name data that depicts the associated entity in a readable form, such as with a plain text name or other entity designator. As FIG. 3 shows, entity name data may be stored, for example, in an entity name field 325 in entity profile data.

In some examples, the storage unit stores computer executable instructions to make entity profile data correspond to a first entity accessible to certain applications, such as applications associated with the first entity. In some examples, the computer executable instructions to make entity profile correspond to the first entity accessible to certain applications may define an entity selection framework referenced by each of the applications. For example, the entity selection framework may define a header, library, API, or other program module. The entity selection framework may include computer executable instructions for displaying an entity selector user interface with particular graphical features in applications referencing the entity selection framework.

The set of software applications stored in the storage unit may include any currently known or later developed type of software. The software may be directed to any manner of applications, including word processing, data management, accounting, inventory management, financial planning, ecommerce, communications, and the like. The set of software applications may include a single software application, such as a first application, a few applications, such as the first application and a second application, or a large number of applications.

In some examples, the application server includes a processor and is configured to at least partially run one or more of the software applications. The application server may be configured to exclusively run a given software application, to support a client computer running the given software application by answering calls from the client computer, or to not run the given software application at all, but instead to let the client computer exclusively run the given software application.

The entity profile data in method 400 corresponds to entities who have subscribed with the provider of method 400. In some examples, the entities need not subscribe with the method provider, but instead the method may simply work with a collection of entities. In method 400, a first entity and a second entity have subscribed with the method provider and are included in the entity profile data. In this context, entities may be individuals, businesses, institutions, or other groups.

A user of method 400 may have one or more entities associated with him. For example, an accountant may prepare tax returns for a first company and a second company and is considered to be associated with the first company and the second company. A given user may be associated with a large number of entities depending on the application. In method 400, the user is associated with a first entity and a second entity.

The storage unit may store entity association data for each user to associate entities with the users. In some examples, this entity association data may be stored in a user record associated with the user in user data, such as a user record 335 in user data 330 displayed in FIG. 3. User records, in some examples, include a list of the entities with which the user is associated. The entity association data may be stored in a user record, in an entity profile record, or in a separate record source.

In some examples, entities profile data may include a list of approved users. Such lists of approved users may be cross-referenced with user records to find the effective entity association data listing the entities associated with a user. For example, FIG. 3 displays an example with a plurality of entity profiles, such as first entity profile 321, and each entity profile includes a list of approved users. For example, first entity profile data includes approved users data 327 storing approved users. In some examples, approved user data may include user ID data associated with subscribed users. In some examples, the approved user data may be cross-referenced with user records to determine the users subscribed to an entity. A given user that is referenced in approved users data 327 is, in effect, associated with that entity.

With the entity association data or effective entity association data, components utilized in method 400, such as the application server, client computers, and computer executable instructions, may effectively identify which entities are associated with a given user at step 415.

In some examples, the user may designate a default entity and the method may automatically select the default entity when the user initiates a session with the application server. Designating a default entity may provide convenience to the user by automatically displaying a list of applications associated with the default entity when user initiates a session with the application server.

Additionally or alternatively, the user may designate a default application and the method may automatically run the default application when the user initiates a session with the application server. The default application may be associated with an entity or may be entity independent. When the default application is associated with an entity, the method may automatically run the default application when the entity in question is selected. If the entity happens to be the default entity, the method may automatically select the default entity and run the default application when the user initiates a session with the application server.

In general, the method may include associating one or more applications in the set of software applications with selected subscribed entities. In some examples, the method includes associating each application in the set of software applications with selected subscribed entities. In this context, selected subscribed entities are the entities to which applications are to be associated. The entity-application associates may be made by receiving user input or may be made by applying predetermined logic. For example, entities identified as accounting firms may automatically have accounting applications associated with the entity. Additionally or alternatively, entities may subscribe to applications according to a paid subscription model. If the entity pays for the subscription, users associated with the entity may have access to the associated application. Additionally or alternatively, users may pay for access to a particular application. In some examples, when users purchase access to applications, the users may be able to use the applications in association with each entity to which they are subscribed.

In some examples, the methods described herein include allowing applications to modify entity profile data stored in the storage unit. For example, the method may allow an application associated with a given entity to modify the entity profile data corresponding to the given entity. First application 311 displayed in FIG. 3, for example, may be associated with the first entity. As a result, first application 311 may be allowed to modify data stored in a first application dataspace 328 associated with first entity profile 321. Allowing a software application to modify the entity profile data may help update the entity profile data, and in some examples other applications associated with the same entity may accessing the updated entity profile data.

The method may include storing state data associated with a given entity in the entity profile data for the given entity. Additionally or alternatively, the method may include retrieving state data associated with a given entity. For example, state data associated with first application 311 displayed in FIG. 3 may store state data in first application dataspace 328. Likewise, first application 311 may retrieve the state data from first application dataspace 328.

In some examples, application dataspaces may include user-specific subspaces that users may use to store user-specific data associated with a particular entity. For example, a user may be granted access to use an application based on the user's association with an entity. The user, however, may have data associated with the application that are not necessarily to be shared with the entire entity, as an example. Such data may be stored in the user-specific dataspaces. The user-specific subspace may be identified, for example, using the user's user ID.

Additionally or alternatively, application servers may be configured to store user-specific data that is stored outside of subscribed entities' entity profile data. Such data may be stored, for example, in user-specific dataspaces stored in user records, such as user record 335. The user-specific dataspaces may be configured to store, for example, personal documents that are not associated with the entities with which the user is subscribed. The user-specific dataspaces may be particularly useful when a user is granted access to an application by virtue of the user's association with an entity, but uses the application to do personal work additionally or alternatively to the work done for the entity.

Storing and retrieving state data for the given entity may occur when the given entity is selected by the user. As described in this disclosure, a user may select a given entity in a variety of ways, including by clicking a graphical depiction of the given entity in a user interface displaying a set of entities associated with the user.

In examples where state data is saved by the method provider, the method may include incorporating stored state data into one or more software applications. For instance, the method may incorporate stored state data associated with a given entity into a selected application. The state data may be incorporated into a selected application automatically when the application server receives instructions from a user to execute the selected application. For example, the user may select a selected application from a set of software applications associated with a given entity by clicking on a label, icon, or other graphical depiction of the application in a user interface.

In some examples, the state data associated with a user's session with the application server with entity profile data for a first entity loaded may be used when the user loads the entity profile data for a second entity. Sharing state data associated with sessions directed to a first entity and a second entity may make it more convenient and efficient for a user to complete tasks for different entities. For example, if the same type of engineering design data needs to be entered into an engineering program at a specific location in the program for different entities, the user may find it convenient and efficient to switch entity profiles and enter the same type of data at the same location in the program for the second entity after entering that data for the first entity.

The state data may include any application variable or collection of application variables existing in memory at a given point in the application's execution. The concept of state data as is well understood by those having skill in the computer science arts and need not be explained more here.

In some examples of the methods described herein, the state data may include previous location data associated with a location at which a client computer was pointed to at a given time. For example, the previous location data may include a uniform resource locater storing a location at which the user was pointed the last time the user was using the associated application. The given time might be just before a user navigates away from a given entity or navigates away from a given application. In examples where the method stores state data directed to the user's location within a given application, the method may include automatically navigating to the location associated with the previous location data when the user selects a given entity and/or the given application corresponding to the state data. In the example shown in FIG. 3, for example, each application dataspace, such as application dataspace 328, may include previous location data associated with the last page visited in each application. Additionally or alternatively, each user record 335 may include previous location data associated with each application and/or each application and entity pair.

Additionally or alternatively to state data, the method may include associating client data with the entity profile data for a given entity. The client data may be input by a user at a client computer and received by the application server. In some examples, the method automatically associates the client data with the entity profile data for a given entity when the user has selected the given entity, such as via a user interface presented to the user on a client computer. In some examples, the active entity may be stored. For example, the client computer 380 shown in FIG. 3, for example, stores the active entity in an active entity field 386 in a local session memory 385.

Receiving credentials associated with the user from a client computer with the application server at step 410 may include receiving a user name and password for the user. The credentials may be compared to user ID data and authentication data, such as user ID data stored in a user ID field 337 and authentication data stored in an authentication data field 339. Any information or combination of information suitable to distinguish a given user from other user is sufficient for the credentials. For example, the credentials may be a name, a number, a signature, a biometric marker, such as a finger print, etc.

In some examples, receiving credentials associated with the user includes comparing the credentials with user authentication data associated with the user. As discussed above, the user authentication data may be stored in a user record in the storage unit. To limit access to the application server and the data stored thereon, the method may include allowing the client computer to access to the entity profile data only if the credentials received are consistent with the user authentication data.

As FIG. 4 illustrates, an active application is transferred to the client computer at step 412. The active application may be, for example, a default application associated with the current user and/or entity. In some examples, the default application is the last application associated with the entity used by the user.

In method 400, displaying a visual representation of the subscribed entities associated with the user on the client computer at step 420 includes, at least, displaying the first entity and the second entity. The visual representation displayed may be referred to as a launching pad or an entity selection element including a user-selectable list of entities. Displaying the visual representation may include displaying all of the subscribed entities associated with the user or a subset of the subscribed entities. For example, displaying a visual representation may include simultaneously displaying a graphical representation depicting each entity in the user subset of entities associated with the user.

In some examples, displaying a visual representation includes displaying an entity selector user interface with consistent graphical features in each application in the set of software applications. Consistent graphical features may be achieved by a given application referencing an entity selection framework. The entity selection framework may include computer executable instructions for displaying in the set of software applications the entity selector user interface with particular graphical features. By referencing a common entity selector user interface, the graphical features of that user interface will be in common between the different applications.

Figure 8:
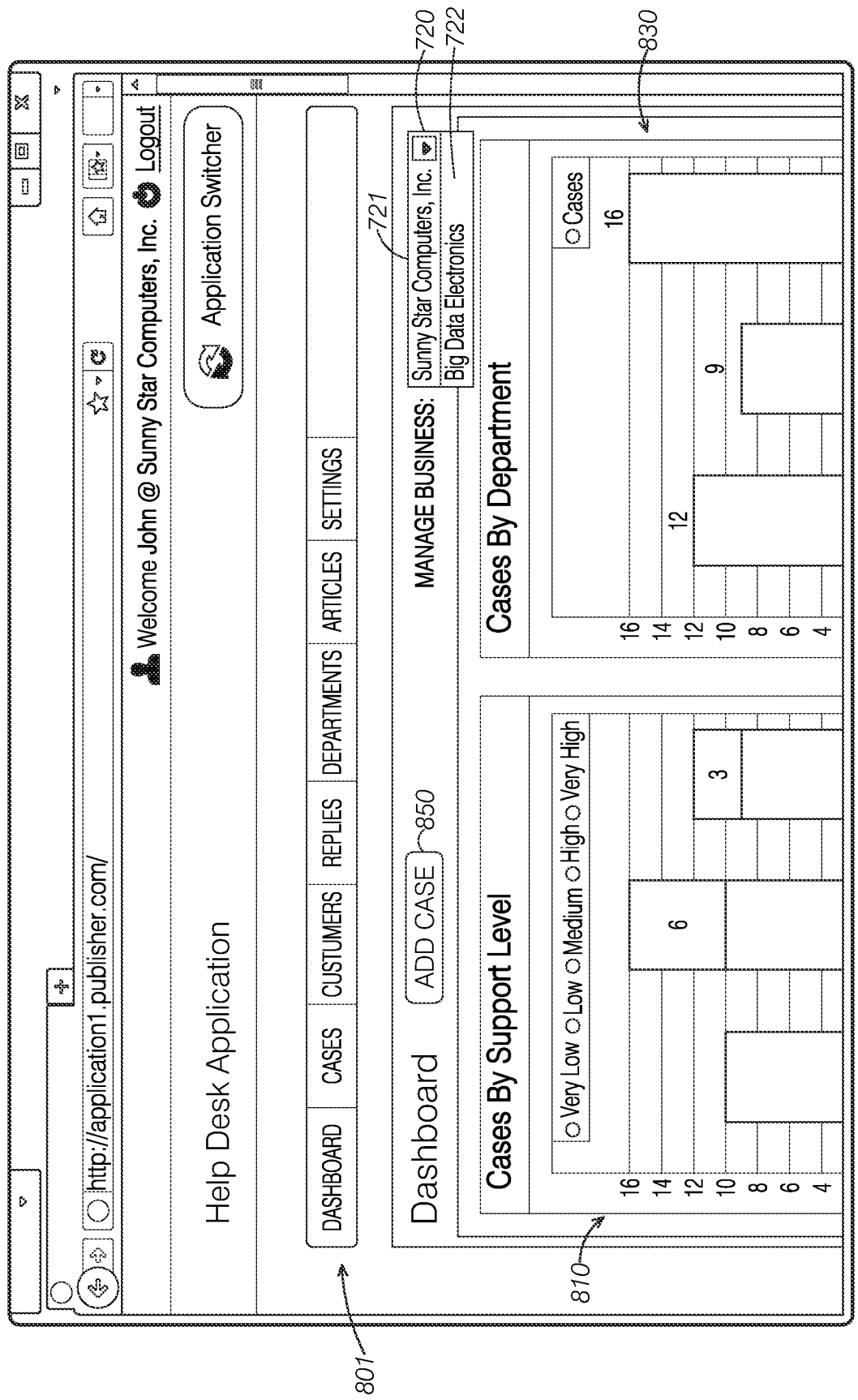
FIG. 8 is a screenshot of an example of an application implementing features of the disclosed methods.

In some examples, the entity selection user interface may include an entity selection element. The entity selection element may include a drop-down box that includes a list of the applications associated with an active user. FIG. 8, for example, displays an example entity selection element, entity selection element 720. As FIG. 8 shows, entity selection element 720 defines a drop-down list with the default entity selected. When in an expanded configuration, entity selection element 720 is configured to each of the entities associated with the current user. The user may, for example, expand the drop-down list and click on a visual representation of an entity to select that entity. When the entity is selected, entity profile data may be stored and retrieved in associated applications used by the current user.

Figure 5:
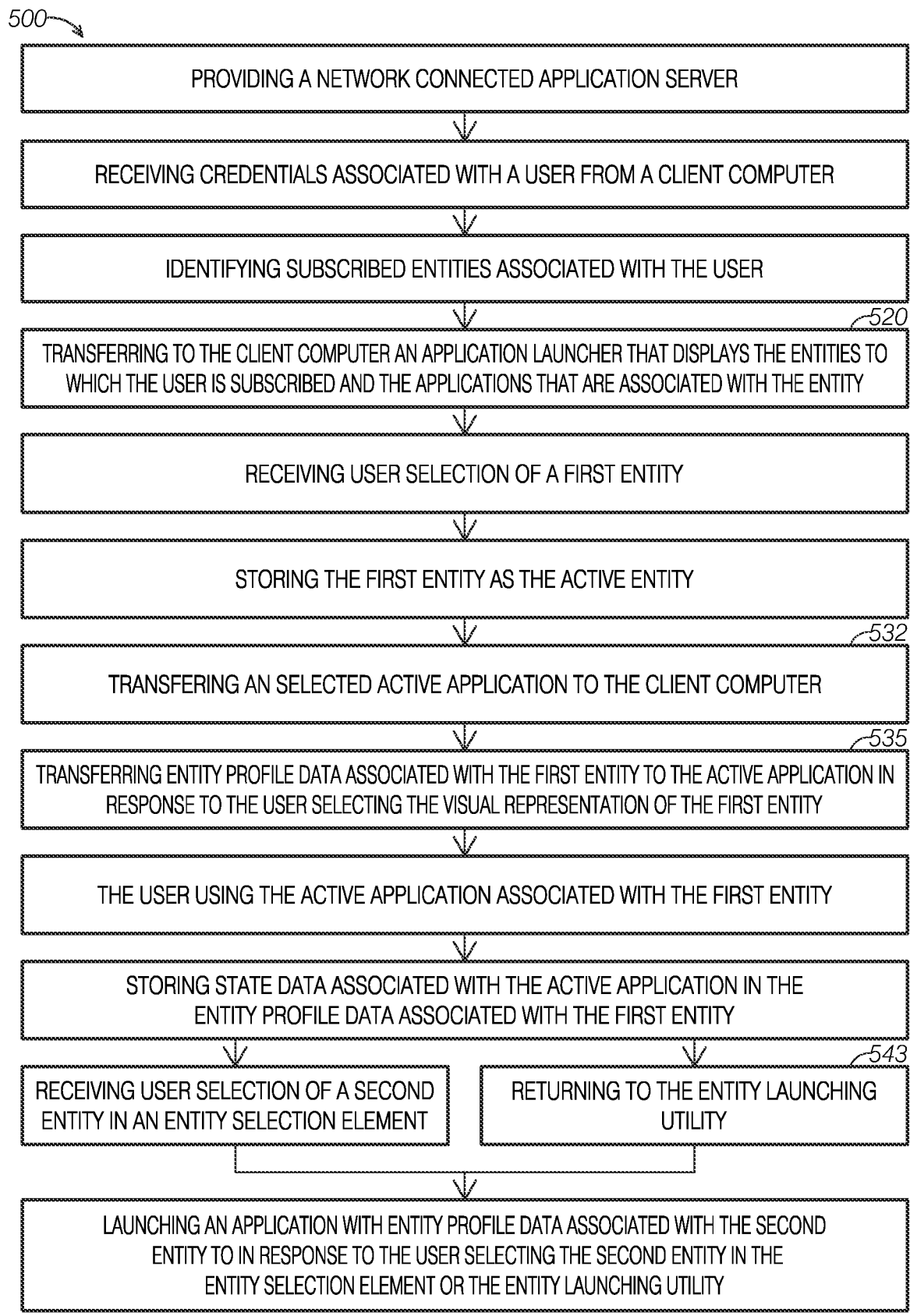
FIG. 5 is a screenshot of an example of a method for managing entity profiles.
Figure 7:
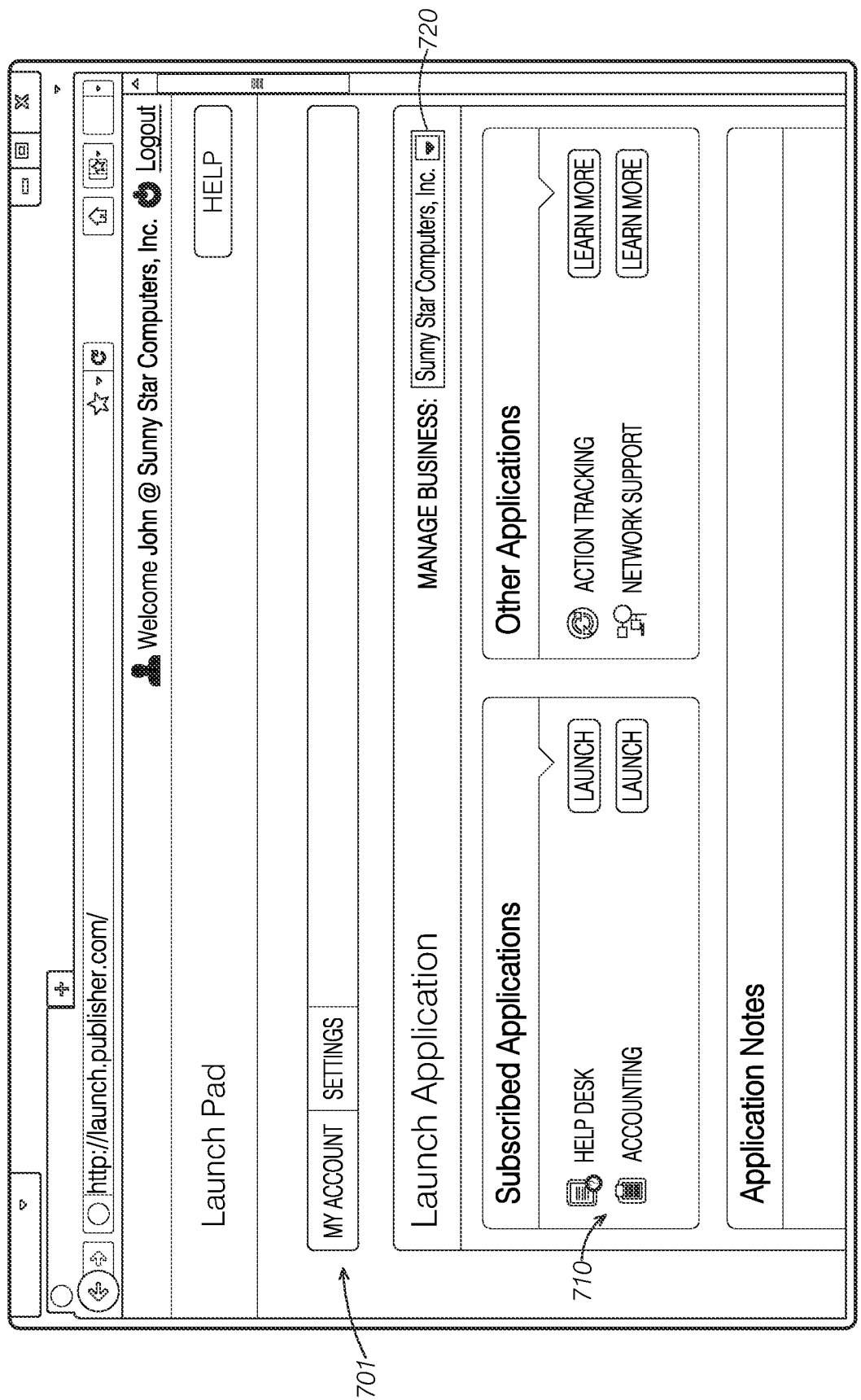
FIG. 7 is a screenshot of an example of an entity launching utility implementing features of the disclosed methods.

In some examples, an entity launching page may be displayed instead of an entity selector. For example, FIG. 5 provides an additional or alternative example of a method for managing for managing entity profiles, method 500, in which an entity launching utility is displayed. FIG. 7 illustrates an example of an entity launching utility, entity launching utility 701, being displayed. As FIG. 7 illustrates, entity launching utilities may include entity selection elements, such as entity selection element 720.

As FIG. 4 illustrates, user selection of a first entity is received at step 425. The user may select the first entity, for example, with an entity selection element or an entity launching utility. For example, a user may select the first entity in an entity selection element, similar to entity selection element displayed in FIG. 7, displayed on the active application.

As FIG. 4 shows, the first entity is stored as the active entity at step 430. The first entity may be stored as the active entity, for example, by adjusting an active entity tag to a value identifying the first entity as the active entity. The active entity tag may be stored in session memory; for example, the active entity tag may be stored in an active entity field in local session memory 385 in the example illustrated in FIG. 3. The active entity may additionally or alternatively be stored on the application server. The active entity tag, which may define a variable, file, database entry, or other means of storing data.

Setting the active entity tag allows the application to know the appropriate entity to associate with the current user's use of the active application. For example, setting the active entity to the first entity indicates that the application server should direct the active application to store and retrieve data from entity profile data associated with the first entity. In the example illustrated in FIG. 3, for example, data stored and received in first application 311 when the entity associated with first entity profile 321 is currently the active entity, reads and writes executed with first application may be directed to first application dataspace 328.

As FIG. 4 shows, entity profile data associated with the first entity is transferred to the active application at step 435. The entity profile data may include saved data, saved state data, or other data associated with the entity and/or application. For example, the entity profile data may include data stored in an application dataspace associated with the active entity and the active application.

In the example shown in FIG. 3, entity profile data associated with a first entity may be stored in first entity profile 321 in application data storage 323. The entity profile data associated with first entity and the first application may be stored in first application dataspace 328.

The entity profile data retrieved and transferred to the active application may include several types of data, including state data, including previous location data, and application records. The state data, for example, may be restored to return the active application to the previous configuration and location as the previous time the user used the application.

Application records may include documents, saved files, or other work saved from a user the previous time the user used the application. For example, the active application may define a word processor. In such an example, the application records saved in the entity profile data may include one or more documents created during prior instances of the word processor being executed. The documents may have been created, for example, by the current user or others users who are subscribed to the associated entity.

In some examples, the entity profile data may include user data associated with the current user. The user data may, for example, indicate the associated user was the last user to use the associated application; for example, a word processor may use the user data to indicate that a user was the last to edit certain documents or otherwise use the active application. Additionally or alternatively, entities may restrict certain applications and/or features thereof to particular users. In such case, the active application may determine whether the current user is authorized to use such restricted applications.

As FIG. 4 shows, the user uses the active application associated the first entity and the active application at step 437. As discussed above, any read or write operations associated with the user's use of the active application when associated with the first entity and the active application is directed to a first application dataspace in the entity profile data associated with the first entity. The application may additionally or alternatively read or write to the entity profile data of other application dataspaces associated with the first entity. Accordingly, applications associated with the same entity may interact with one another and be aware of modifications to one another.

As FIG. 4 shows, state data associated with the active application is stored in the entity profile data associated with the first entity at step 440. As discussed above, the active application is configured to write to an application dataspace associated with the active application and the first entity. Further, applications, in some examples, are able to store data in application dataspaces in the associated entity profile data associated with other applications associated with the same entity. Such writing of data across applications may promote application awareness amongst applications associated with the same entity.

As FIG. 4 illustrates, user selection of a second entity is received at step 445. By selecting the second entity, the user indicates a desire to work on tasks associated with a different entity. By selecting the second entity, the user sets the second entity as the active entity.

As FIG. 4 illustrates, the active application is refreshed with the entity profile data associated with the second entity. By selecting the second entity, the user indicates that the active application should be switched to direct to read and store data associated with a second entity. In the example shown in FIG. 3, for example, the user may select the fourth entity, thus directing data associated with the active application to the entity profile data stored in fourth entity profile 322. Assuming first application 311 is still the first application data, operation within the first entity would read and write with first application dataspace 329 associated with fourth entity profile 322.

Because the user remains in the same active application, there is often no need to load a different page or application. Rather, the same application and/or page may be refreshed, but after the refresh the active application should reflect the entity profile data associated with the second entity rather than the entity profile data associated with the first entity.

In some examples, the refresh may direct the user to a default page within the active application. In some examples, the refresh may direct the user to a previous location associated with previous location data saved in the application dataspace associated with the active application and the second entity. In some examples, the refresh may, in fact, direct the user to a different application altogether, for example, the refresh may direct the user to a previously accessed location in a previously used application. In some examples, this may be the last used location in the last used application.

With reference to FIG. 5, an additional or example method for managing entity profiles in software applications, method 500, will now be discussed As FIG. 5 shows, method 500 shares similar or identical features with previously discussed methods that will not be redundantly explained.

Method 500 differs from method 400 at several steps. For example, method 500 does not transfer an active application to the client computer, as method 400 does at step 412. Rather than launching an active application, the application server initially transferring to the client computer an application launcher that displays the entities to which the user is subscribed and the applications that are associated with the active entity at step 520. In some examples, the entity launching utility may define a single page that simultaneously displays all of the entities associated with a user and all of the applications associated with the active entity.

A selected active application is transferred to the client computer, rather, in response to the client selecting an application in the entity launching utility at step 532. This may occur after selecting an active entity, as the user may desire to navigate between entities using an entity switching utility displayed on the entity launching utility and view associated applications prior to selecting an application. Because the entity launching utility is launched by default and provide the user with displays of the applications associated with the currently selected entity prior to launching, the active application is only launched at this stage. The entity profile data is then incorporated in this page like in method 400 at step 535.

In many cases, active entity at the time the entity launching utility is launched will be selected automatically, because it may be the first page that the user is exposed to when using applications that implement associated methods. For example, the active entity may be a user's default entity. In some examples, the active entity is the last entity in which the user operated.

As FIG. 5 shows, method 500 additionally allows the user to return to the launching utility to select a new entity and/or application at step 543, rather than navigating between entities using each application's entity switching utility 720. In some examples defaulting to an entity launching utility, however, applications may still include entity switching utilities, and thus may switch entities directly without returning to the launching utility. Some examples, however, may not include application switching utilities. In such examples, an application launching utility may be required to switch between applications and/or entities.

FIG. 7 displays an example screenshot displaying an example entity launching utility, entity launching utility 701. As FIG. 7 shows, entity launching utility 701 includes a list of applications 710, which may be pre-compiled applications associated with the currently selected entity. The user may select any of these applications to launch the selected application associated with the currently selected entity. Further, entity launching utility 701 includes an entity switching utility 720 that allows the current user to log in to a different entity.

Entity launching utility 701 allows a user to quickly navigate between the entities and applications to which he is subscribed. For example, a user may use the entity switching utility 720 to navigate between entities while pointed to the entity launching utility. In such examples, application list 710 may update to reflect the subscribed applications associated with the currently selected entity. Further, the entity launching utility may display other applications that may be useful for the current entity and/or user.

FIG. 8 illustrates a contrasting method of switching between applications and entities. FIG. 8 illustrates an application that implements both an entity switching utility 720 to switch between entities and an application switching element that allows switching between applications. Rather than navigating between entities through the entity launching utility, a user may use the entity switching utility 720 to operate the same application while changing entities. This may allow a user to quickly navigate through various sets of entity profile data associated with each selected entity. For example, an accountant may have accounting software associated with a plurality of entities associated with client businesses. The accountant may use entity switching utility 720 to switch between his clients' accounting books without needing to enter and exit the application.

Similarly, the application switcher allows the client to navigate between applications associated with the currently selected entity. In some examples, the application switcher may be configured to display a list of all applications associated with an entity, from which the user may select.

FIG. 8 additionally illustrates an example of entity profile data being sent to an application 801 associated with the entity. FIG. 8 illustrates an example help desk illustration, including a cases by support level graph 810 and a cases by department graph 830. As FIG. 8 shows, the cases by support level graph 810 includes data associated with an active entity 721, "Sunny Star Computers, Inc."

As FIG. 8 shows, the current user is associated with two entities, active entity 721 and an alternative entity 722. As FIG. 8 shows, entity switching utility 720 is configured to display a visual representation of each of the entities, defining textual displays of the entities' names, associated with the user when expanded, perhaps simultaneously. Entity selection utility 720 allows the user to select one of the visual representations to select that entity as the active entity. Likewise, the cases by department graph 830 similarly includes data specific to the selected entity. If a user selected a different entity associated with the user, such as alternative entity 722, the page may be refreshed with data specific to the alternative entity, "Big Data Electronics." In such an example, the data displayed within support level graph 810 and cases by department graph 830, while the general layout, look, and feel of the application may remain constant.

Further, FIG. 8 illustrates an add case button 850 that allows the user to add a new case associated with the help desk application. When the case is added, the data associated with the added case may be stored in the entity profile data associated with the currently selected application, active entity 721. If the user switches to alternative entity 722 and selects add case button 850, however, the data associated with the added case would be added to the entity profile data associated with the alternative application, "Big Data Electronics."

Figure 6:
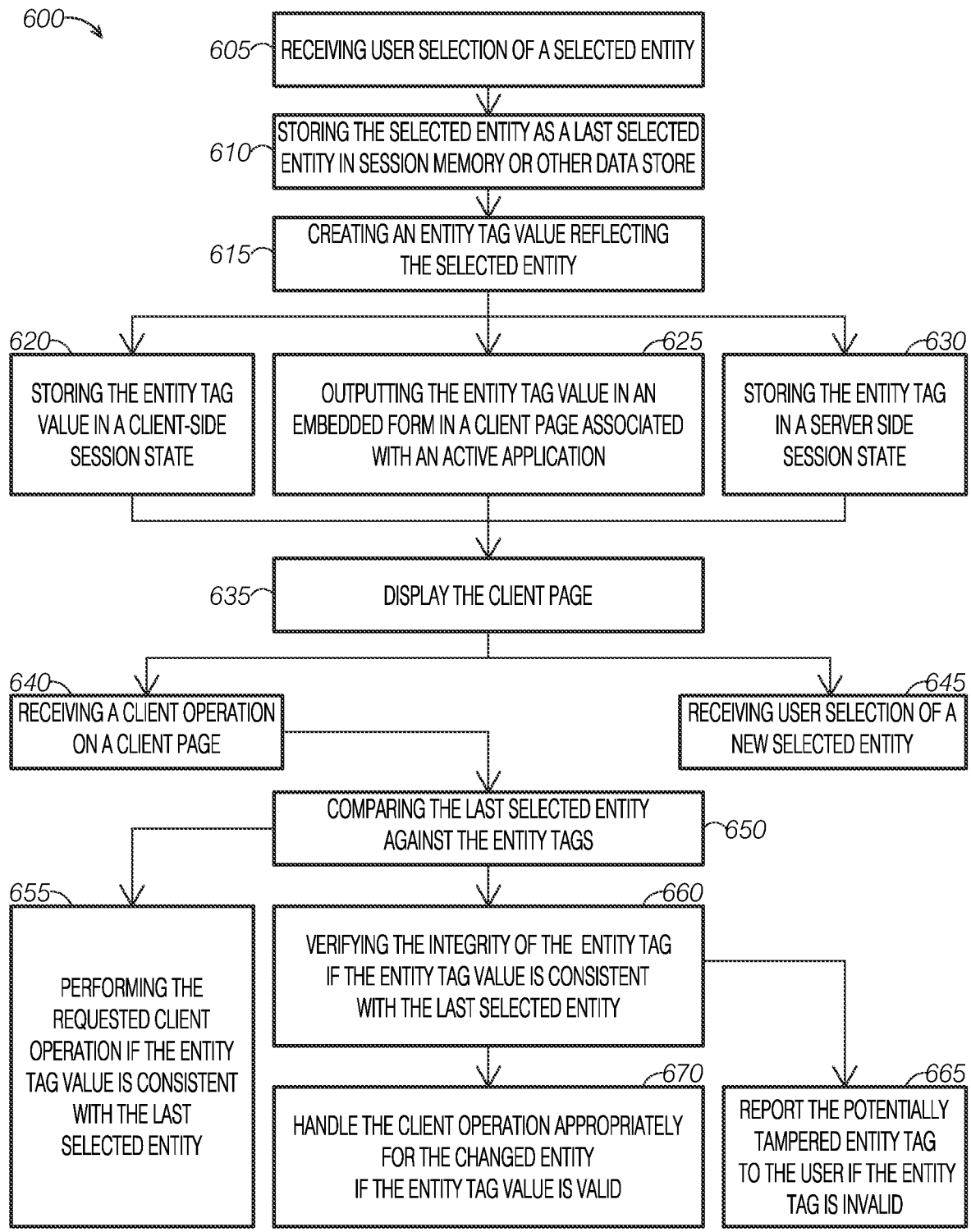
FIG. 6 is a screenshot of an example of a method that may be used in conjunction with methods for managing entity profiles.

With reference to FIG. 6, an example of a data collision prevention method that may be used in association with the disclosed methods for managing entity profiles, method 600, will now be discussed. As FIG. 6 illustrates, method 600 includes receiving user selection of a selected entity at step 605, storing the selected entity as a last selected entity in session memory or other data store at step 610, creating an entity tag value reflecting the selected entity at step 615, storing the entity tag value in a client-side session state at step 620, outputting the entity tag value in an embedded form in a client page associated with an active application at step 625, storing the entity tag in a server side session state at step 630, displaying the client page at step 635, receiving a client operation on a client page at step 640, receiving user selection of a new selected entity at step 645, comparing the last selected entity against entity tags at step 650, performing the requested client operation if the entity tag value is consistent with the last selected entity at step 655, verifying the integrity of the entity tag if the entity tag value does not match the last selected entity at step 660, report the potentially tampered entity tag to the user if the entity tag is invalid at step 665, and handle the client operation appropriately for the changed entity if the entity tag value is valid at step 670. As FIG. 6 illustrates, several of the steps of method 600 are conditional, and may only be performed with certain conditions are met.

Method 600 helps reduce the occurrence of data collisions that may occur in a system that manage a plurality of entity profiles. For example, selecting a new entity in an application may, in some examples, set the new entity as the active entity across all applications associated with the current user. While this may be unlikely to cause problems when a user is operating in a single application or browser instance, problems may arise when the user may have multiple applications or browser instances open simultaneously. For example, if a user is using a first application associated with a first entity in a first browser instance and selects a second entity in a second browser window, data may be redirected to the entity profile data associated with the second entity for applications operating in both browser windows. Users may not anticipate this behavior, and may attempt to record data in the first browser window. Because the active entity has been set to the second entity in the second browser window, the data may be recorded to the second entity rather than the first entity, as the user may expect.

Method 600 provides certain safeguards that reduce the risk of this happening by intercepting, and in some cases, discard, client operations within applications if it detects that a user may have selected a new entity after the user opened an active application.

As FIG. 6 shows, user selection of a selected entity is received at step 605. The user may select the selected entity, for example, using an entity selection element or an entity launching pad. In some examples, selecting the selected entity may additionally transfer, to the client computer, computer executable code associated with an active application, in which the user may operate in association with the selected entity.

As FIG. 6 illustrates, the selected entity is stored as the last selected entity in session memory or other data store at step 610. For example, in the example shown in FIG. 3, the last selected entity may be stored in a last selected entity field 342 stored in server-side session memory 340, which may, for example, be stored in a remote session memory located remotely from associated client computers. For example, the server-side session memory may be stored on application servers. In some examples, the server-side session memory may be associated with a particular user, so that the last selected memory and saved remote session data corresponds to the current user's activities. Additionally or alternatively, the server-side session memory may be stored in a user's user record, such as user record 335 shown in FIG. 3. In some examples, the last selected entity may be stored in the user's user record, separate from the server-side session memory.

As FIG. 6 shows, an entity tag value reflecting the selected company is created at step 615. The entity tag value indicates the selected entity. The entity tag value may be stored, for example, as plain text, in an encrypted form, in a hash, a concatenation of page location and entity ID, or a concatenation of an entity ID and other values. In examples wherein the entity tag value is embedded within the page itself, entity tags may not need to store a page within the tag value, as the application server will likely identify the page without assistance from the tag value.

As FIG. 6 illustrates, entity tags may be stored in up to three locations: in a client-side session state at step 620, output as an embedded form in a client page associated with an active application at step 625, and in a server side session state at step 630. By storing the entity tag in a number of locations, the application may be able to properly track the entity associated with an active application in a variety of configurations. In some examples, entity tags may be stored in all three of the locations described above. Further, by storing multiple copies of the entity tag, the application server may be able to verify the integrity of an entity tag to determine if it has been tampered with.

As FIG. 6 shows, the entity tag is stored as a page and tag value pair in a client-side session state at step 620. For example, the example shown in FIG. 3 stores a plurality of local entity tags 389 in local session memory 385. Because the entity tags are delineated from the specific pages, entity tags stored solely in a client-side session memory may, in some examples, include both the page and the tag value. For example, if a client loads a first page associated with an application while a first entity is selected, the entity tag's page value will designate the first page and the tag value will designate the first entity. The local session memory in which entity tags are stored may define session variables, a browser cookie, another file type, or any other form of client-side data storage that remains persistent as an associated application remains active.

Client-side entity tags may be useful, for example, for distributing entity tag storage to the client computers. This may reduce the storage and processing load of application and/or state servers. Further, if the same user is logged in on to the application server on two different client computers, the integrity of server-stored entity tags may not be maintained, but with client-side entity tags, each client maintains its own state. However, because clients may deactivate client-side session management, by deactivating cookies or browsing in safe/incognito modes, this type of entity tag may not be sufficient as the sole method of storing the entity tag.

As FIG. 6 shows, the entity tag is embedded in a client page at step 625. For example, the example shown in FIG. 3 stores a page entity tag 395 in a displayed client page 398. By embedding the entity tag directly into a client page associated with an application, the entity tag is very closely associated with the application. Because the entity tag is injected directly into client pages associated with the application, the entity tag may remain persistent in any application. However, since this tag would often be dependent upon postback of the page, so that the page represents itself back to the server, typically when a user clicks a submit button, this entity tag storage technique may be insufficient to rely on solely. In some examples, entity tags may be associated with an entire application rather than a single page, which may reduce the amount of session memory reads and writes. Additionally or alternatively, in examples wherein tags are stored within the page itself, the client page may otherwise be determinable by the application server and/or applications and thus not stored in the tag.

As FIG. 6 illustrates, the entity tag is stored as a page and tag value in a server-side session state at step 630. For example, the example shown in FIG. 3 stores a plurality of remote entity tags 392 in remote session memory 340. As previously discussed, the entity tags in session memory are delineated from the specific pages, and entity tags stored in session states may, in some examples, include both the page and the tag value as a result.

As previously discussed, some clients may reject client-side entity tag storage altogether or developers may prefer to retain control of certain session memory values at the server level. In these circumstances, a server-side entity tag reflective of the active application and/or page may be used to verify whether the client page is properly associated with the last selected entity to properly handle data collisions. However, since server-side storage of entity tags may consume significant server-side resources for potentially the maximum theoretical life of sessions, this technique may not be fully desirable as a complete solution.

As FIG. 6 shows, a client page is displayed at step 635. This is typically associated with an active location. In some examples, the user may have multiple client pages open, which causes the risk of data collisions. For example, a user may have a first client page associated with a first entity open in a first browser instance and later open a second client page associated with a second entity in a second browser instance. Because the entity tag value was stored at steps 615-630, each client page should have at least one valid entity tag indicating the entity with which it is associated. In some examples, full applications may serve the same role as client pages in disclosed methods. In such examples, entity tags would be stored and checked in association with all pages associated with the application, as opposed to each individual page.

As FIG. 6 illustrates, a user may select a new selected entity at step 645. This may occur in the same browser window, which essentially resets method 600 to step 610. In some examples, however, a user may select a new selected entity in a different browser window, setting up the possibility of data collisions.

As FIG. 6 shows, a client operation on the client page is intercepted at step 640. For the purposes of this disclosure, the client operation is intercepted to verify that the entity tag value associated with the client operation is consistent with the last selected entity.

The client operation may define any action on the client page. This disclosure notes, however, that user input that may initiate a store operation may be particularly likely to initiate a data collision, and method 600 may be particularly beneficial with used to intercept user input operations.

As FIG. 6 shows, one or more of the stored entity tags are compared against the last selected entity at step 650. In such examples, each entity tag value that was properly stored, such as the ones stored at steps 620-630, are compared against the last selected entity, which may be stored in server-side session memory. During this process, the locally stored entity tags stored at steps 620 and 625 are sent to the application server. In some examples, the application server then iteratively tests each applicable entity tag against the last selected entity.

Because the entity tags remain constant with regard to every active page and/or application even when the selected entity is changed, the entity tags may be compared against the last selected entity to determine whether the associated pages and applications are, in fact, associated with the currently selected entity. Because the last selected entity is changed immediately upon the client selecting a new entity, the last selected entity should be associated with the currently selected entity at all times. Because the entity tags remain constant after the last selected entity has been changed however, it is quite likely that a user may be storing one or more stale entity tags associated with entities other than the active entity when the user has multiple entity application or page instances activated.

If all of the properly stored entity tags indicate that they are associated with the same entity as the last selected entity, the test determines that the entity tag associated with the client operation is valid. In this case, the requested client operation may be performed at step 655.

If any of the entity tags do not define a consistent entity with the last selected entity, further processing may be involved. The application server may, for example, verify the integrity of the entity tags if they do not match the last selected entity at step 660. In most cases, each of the entity tags associated with a page or application should be equivalent as long as they were properly stored. So the integrity of each data tag may be determined by comparing the various entity tags associated with a particular page or application to one another to determine equivalence. In verifying the integrity of the entity tags, the application server may report that the entity tag may be tampered with at step 665. The client and/or application may determine how to handle such actions. In some examples, this may indicate a hacking attempt; in others, it may simply indicate that the tag has been mangled, for example, during data transfer or storage.

The application server is configured to handle the client operation appropriately for the changed entity if the entity tag value is valid at step 670. For example, a display indicating to the client that the last selected entity has changed and the entity tag associated with the current client operation is stale may be displayed. Additionally or alternatively, the client operation may be rejected, thereby preventing any user data input being improperly directed to the wrong entity profile data or preventing any entity dataspace data output from being displayed to a user expecting to see a different entity's data.

Though method 600 is discussed as its own method, it may supplement many of the disclosed methods for managing entity profiles, such as method 400, method 500, and other disclosed methods.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A method for managing entity profiles in software applications, comprising:
   providing an application server storing a plurality of applications, a plurality of users, and a plurality of profiles, wherein:
      each profile corresponds to one of a plurality of entities subscribed to the application server,
      each of the profiles includes a list of one or more of the plurality of applications to which the subscribed entity has subscribed; and
      each of the profiles includes entity data specific to its corresponding subscribed entity;
   storing a list of the subscribed entities associated with each of the plurality of users;

receiving, by the application server, credentials associated with one of the plurality of users;

identifying, by the application server, the subscribed entities associated with the user;

providing an application from the plurality of applications to a client computer in response to the user selecting the application;

providing, within the application or within a framework accessible to the application, a selector for the user to select from the subscribed entities associated with the user who are also subscribed to the application, the selector provided by an entity selection framework;

transferring to the application, entity data from the profile of a first entity in response to the user selecting the first entity from the selector;

executing the application with the first entity data;

receiving a selection of a second entity from the selector from the user, and in response:

updating the first entity data into the profile of the first entity;

transferring entity data from the profile of a second entity to the application in response to the user selecting the second entity from within the application;

refreshing the application with the second entity data, so that the entity data from the first entity profile is replaced in the application with the entity data from the second entity profile; and executing the application with the second entity data.

2. The method of claim 1, wherein the application server includes a processor and further comprising executing, at least partially, the application with the processor of the application server.

3. The method of claim 1, further comprising receiving with the application server client data input by the user on the client computer;

wherein selecting the first entity includes associating the client data received by the application server with the first entity in the entity data.

4. The method of claim 1, further comprising modifying the profile corresponding to the first entity when the first entity subscribes to the second application.

5. The method of claim 1, further comprising displaying an entity selector user interface with consistent graphical features in each application in a set of software applications including the application by referencing with a given application the entity selection framework including computer executable instructions for displaying in the set of software applications the entity selector user interface with particular graphical features.

6. The method of claim 1, further comprising updating the first entity data in the entity profile corresponding to the first entity when or after the first entity is selected.

7. The method of claim 6, further comprising retrieving state data associated with the first entity in response to the first entity being selected.

8. The method of claim 7, wherein the state data includes a uniform resource locater storing a location in the application at which the client computer was pointed to immediately prior to the user navigating away from the first entity, further comprising automatically navigating to the location associated the uniform resource locater when the user again selects the first entity and the application.

9. The method of claim 7, wherein retrieving state data includes retrieving state data from a shared state data memory accessible to each of the subscribed entities, further comprising:

receiving instructions from the user to select the second entity; and retrieving state data associated with the first entity from the shared state data memory.

10. The method of claim 1, further comprising:

storing, on the application server, a last selected entity value corresponding to the first entity in response to the user selecting the first entity; and intercepting a client operation within an active application if an entity tag value associated with the active application is not consistent with the last selected entity value.

11. The method of claim 10, wherein:

the entity tag value defined by the active application is inconsistent with the last selected entity value;

the client operation has been received on the active application; and intercepting the client operation entered on the active application includes:

comparing the entity tag value associated with the active application with the last selected entity value; and rejecting the client operation based on the inconsistency between the entity tag value and the last selected entity value.

12. The method of claim 10, further comprising adjusting the last selected entity value to identify, upon execution of the first entity, the first entity as the last selected entity selected amongst the subscribed entities;

wherein:

the entity tag value defined by the active application is consistent with the last selected entity value;

the client operation has been received on the active application; and intercepting the client operation entered on the active application includes:

comparing the entity tag value associated with the active application with the last selected entity value; and accepting the client operation based on the consistency between the entity tag value and the last selected entity value.

13. The method of claim 1, wherein the first entity defines a user-designated default entity configured to be selected automatically when the user initiates a session with the application server.

14. A hosted entity management method, comprising:

providing a network connected application server including one or more storage units storing a plurality of software applications and a plurality of entity profiles, each corresponding to at least one subscribed entity, each entity profile including entity data and a list of approved users, and each subscribed entity subscribed to at least one of the plurality of software applications;

receiving by the application server credentials associated with a user via a client computer wherein:

receiving credentials associated with the user includes comparing the credentials with user authentication data for controlling access to a portion of the plurality of software applications, to which the user is subscribed; and the user is provided access to the entity data of a given entity profile only if the credentials are consistent with the user authentication data and the user is in the list of approved users of the given entity profile;

loading a launching utility on the client computer that includes computer executable instructions for displaying a user interface on the client computer, where the user interface displays the software applications in the portion of the plurality of software applications;

loading a selector provided by an entity selection framework to provide a list of all subscribed entities that include the user in the list of approved users in each subscribed entity's corresponding profile;

loading, on the client computer, either:
  a selected application in the user subset of the plurality of software applications in response to a user selecting the selected application on the user interface, and updating the selector to provide a list of only those subscribed entities that are subscribed to the selected application; or
  a modified user interface, in response to the user selecting a subscribed entity from the selector, that displays a subset of software applications to which the subscribed entity is subscribed;

transferring user data from a first entity profile stored on the storage unit to the selected application;

receiving a selection of a second entity profile; and transferring user data from the second entity profile storted on the storage unit to the selected application, so that the user data from the first entity profile is replaced in the selected application by the user data from the second entity profile.

15. The method of claim 14, wherein:

the launching utility defines an entity launching utility and includes computer executable instructions for identifying a user subset of entities associated with the user;

displaying the user interface on the client computer includes simultaneously displaying a graphical representation depicting each application in the subset of applications associated with the selected entity.

16. A hosted entity management method, comprising:

providing a network connected server including a storage unit storing entity profile data corresponding to subscribed entities, the subscribed entities including at least a first entity and a second entity associated with a user;

providing a plurality of applications, each application defining a software application including a selector within the application to select from entities associated with the application, the selector provided by an entity selection framework, and wherein the first entity and second entity are each associated with a plurality of applications that is at least a subset of the plurality of applications;

receiving a user selection of the first entity;

providing, to a client computer, a list of the subset of the plurality of applications associated with the first entity;

storing, on the server, a last selected entity value corresponding to the first entity in response to the user selecting the first entity;

storing an entity tag value associated with an instance of an active application that is part of the plurality of applications associated with the second entity, the entity tag value identifying the instance of the active application as associated with the second entity; and intercepting a client operation within the instance of the active application if the entity tag value is inconsistent with the last selected entity value.

17. The method of claim 16, wherein intercepting the client operation includes comparing the last selected entity value with the entity tag value, which may be stored in a client-side session memory, depicted in computer executable code associated with the active application, or stored in a server-side session memory.

18. The method of claim 16, wherein each subscribed entity includes an approved user list, each approved user list including all users associated with the corresponding subscribed entity who are approved to access entity profile data associated with the subscribed entity.

19. The method of claim 1, wherein the entity selection framework comprises a program module that is referenced by each of the plurality of applications.

* * * * *